(12) United States Patent
Link et al.

(10) Patent No.: US 7,058,980 B1
(45) Date of Patent: Jun. 6, 2006

(54) DEVICE AND METHOD FOR PROTECTING MEMORY DATA AGAINST ILLICIT ACCESS

(75) Inventors: Jean-Francois Link, Trets (FR); Dragos Davidescu, Aix-en-Provence (FR)

(73) Assignee: STMicroelectronics S.A., Gentilly (FR)

( * ) Notice: Subject to any disclaimer, the term of this patent is extended or adjusted under 35 U.S.C. 154(b) by 730 days.

(21) Appl. No.: 09/723,348

(22) Filed: Nov. 27, 2000

(51) Int. Cl.
*G06F 12/14* (2006.01)

(52) U.S. Cl. .......... 726/34; 714/763; 711/166

(58) Field of Classification Search ........ 713/164–165, 713/193, 200; 714/718, 763, 807; 711/154, 711/156, 163–164, 166
See application file for complete search history.

(56) References Cited

U.S. PATENT DOCUMENTS

| | | | | |
|---|---|---|---|---|
| 5,421,006 A | * | 5/1995 | Jablon et al. ............ | 714/36 |
| 5,646,535 A | * | 7/1997 | Dornier .................. | 324/556 |
| 5,737,760 A | * | 4/1998 | Grimmer et al. ......... | 711/163 |
| 5,860,099 A | * | 1/1999 | Milios et al. ............ | 711/103 |
| 6,185,696 B1 | * | 2/2001 | Noll ...................... | 714/6 |
| 6,219,789 B1 | * | 4/2001 | Little et al. ............. | 726/34 |
| 6,470,450 B1 | * | 10/2002 | Langford et al. ........ | 713/182 |

OTHER PUBLICATIONS

Tanenbaum, A., Structured Computer Organization, 1976, Prentice-Hall, pp. 10-12.*

* cited by examiner

*Primary Examiner*—Thomas R. Peeso
*Assistant Examiner*—Minh Dinh
(74) *Attorney, Agent, or Firm*—Lisa K. Jorgenson; Jon A. Gibbons; Fleit, Kain, Gibbons, Gutman, Bongini & Bianco P.L.

(57) ABSTRACT

An electronic device for storing protected data is disclosed. The electronic device includes memory protection logic operable to interface with memory, such as non-volatile ROM for storing protected data therein. The protected data in one embodiment is program code. The access to the protected data is restricted by a local processor, such as a microcontroller or microprocessor for execution thereon within the electronic device. Further, the electronic device includes validation logic operative in a first mode, for checking the validity of the data and for producing a validity signal, such as a checksum, enabled to determine whether that data is valid. In order to prevent access to intermediate validity calculations which may allow an individual to gain knowledge of the protected data, a validity signal output control is provided for inhibiting an output of the validity signal to outside the device until the validity of a predetermined quantity of the protected data has been checked. This predetermined quantity is made sufficiently large and preferably equal to all of the protected data. In another embodiment, a reset for setting the contents of the validity signal if the checking is interrupted is also included.

32 Claims, 4 Drawing Sheets

PROTECTED DUMP MODE

C1: Protection option active (protected mode)
C2: Address= ROM extremity
C3: Protected Dump mode selected
C4: Reset checksum to zero → Enter protected dump mode

~2

New dump mode active

C5: Checksum not externally accessible
C6: Checksum= 0 if system reset
C7: ROM CS enabled

4

C8: Address outside ROM
C9: System reset

→ Exit protected dump mode
C10: Reset checksum to zero in case of reset

DEVICE AND METHOD FOR PROTECTING MEMORY DATA AGAINST ILLICIT ACCESS

BACKGROUND OF THE INVENTION

1. Field of the Invention

The present invention relates to the protection of memory data against illicit access, e.g. by a devious exploitation of a "dump" mode, while allowing normal use of that data and the possibility of testing its validity. For instance, the invention can be used to protect against unauthorized external access to source code stored in a read-only memory (ROM) of a microcontroller (MCU) or microprocessor controlled system.

Many programmed systems based on an MCU or microprocessor have a so-called user program stored as computer code in a ROM which usually forms an integral part of the MCU architecture. The user program contains the body of instructions necessary to execute functions for the system user, who may be an end user or equipment manufacturer. The user is only required to consider the user program as a functional unit that allows the controlled system to operate in the intended manner. In certain cases, the provider or proprietor of the user program does not wish to make the contents of the stored computer code accessible to the user, or indeed any other unauthorized party, e.g. to protect proprietary information, to prevent fraud, tampering, etc. In this respect, it can be noted that the normal execution of the user program does not make it possible to reconstitute its program code.

The problem is then to allow the programmed system to read the code stored in the memory for executing the user program, whilst preventing retrieval of that code data from outside the system.

At the same time, it is required to provide an external memory test to check whether there are any programming or data errors. In this case, the system enters into a "dump mode" to scan through the memory contents and deliver an indication of their validity, e.g., in the form of a checksum, to outside test equipment. It is important that this dump mode cannot be exploited by the user or any other unauthorized party to gain access to the memory contents.

2. Prior Art

Various techniques are known in the prior art for protecting stored data in such a context.

One approach involves means that act on the "chip select" (CS) or "chip enable" input of a ROM storing the protected data. The CS input is enabled in a user mode for executing the code, but disenabled when the ROM is set to a test mode by the user, i.e. outside the allowed test conditions. This is generally achieved by means of a fusible link in the ROM. The link is made to by-pass a readout protection, so preventing the chip select input CS from being disenabled. In this way, the chip manufacturer or programmer can use the test option to read out the memory contents (for instance the program code) to check that there are no errors. Once this initial test is completed, the fusible link is blown, e.g. by applying an appropriate high voltage pulse, so that from then on the protection can no longer be bypassed, i.e. the CS input shall be automatically disenabled whenever the test mode is selected. The memory can then only be accessed for executing the code.

This approach, which constitutes a static option, has the disadvantage of involving additional process steps for implementing the fusible link, adversely affecting costs and production yield. It also has the drawback of disenabling the test mode data readout irrevocably, which is not always desirable.

Another known approach is to establish a confidential code for accessing the test mode, or more generally a mode that allows direct access to the ROM data contents. The code is entered e.g. as a combination of logic states applied to different input pins of the system, or a sequence of logic states applied to a predetermined pin. It is less secure than a fusible link and often inadequate to safeguard the memory contents.

One of the memory modes used for such testing, and which thus needs to be protected, is known as the "dump mode". This mode allows all the memory data to be read out sequentially, normally by incrementing or decrementing through successive memory addresses. At each clock cycle, a byte of memory content from a current address is thus sent through an internal data bus, e.g. for processing by a checksum calculation circuit within the programmed system. The checksum calculation circuit performs an iterative algorithm on each byte received to produce a cumulative checksum value. This value is delivered outside the system so it can be compared with an expected value. If the two values are equal, then it is deduced that the memory contents are valid, otherwise the disparity indicates that at least one of the stored bytes was incorrect.

When—as is normally the case—the checksum is performed on a substantial number of bytes, it is not possible to deduce the specific contents of each of these bytes from the value of the checksum delivered by the system.

FIG. 1 is a flowchart which traces the main aspects of a classical dump mode.

The ROM is initially set to be in a so-called "inactive" option (step S1). This option corresponds to a choice submitted by the proprietor of the program entered in the ROM. The inactive option allows a normal dump to be made for reading out the memory contents.

Because the normal dump can be started from any memory address, the latter needs to be specified externally (step S2).

Next, the mode is selected to indicate the way in which the ROM is tested (step S4).

After the above initialization steps, a checksum value stored in an internal checksum calculation circuit is reset to zero (step S6) before starting the dump, to ensure that the checksum calculation from a known reference value.

Then, the ROM chip select CS is enabled (step S8) through a designated pin or command, enabling the readout to be blocked or not.

The inventors have found that the normal dump mode of the prior art makes the memory contents vulnerable to attacks.

Indeed, because the checksum can be started from any address, and jumps can be made between addresses, it is possible to perform a checksum on selected small portions of the memory, e.g. containing just one or two bytes. The value of the checksum can in this case reveal the exact contents of the byte(s), given the very small sample involved and the fact that the checksum algorithms used are generally known.

Secondly, while a normal dump resets the checksum at the start of the algorithm (step S6), no similar provision is made when the programmed system is reset. In the latter case, the system exits from the normal dump mode and the current value of the checksum becomes available externally, just as if the checksum were completed. This condition can also be exploited to pick an arbitrary end point address for the checksum calculation, simply by selecting when—in terms of clock cycles—to apply a system reset.

In this way, an attacker can use the dump mode option to trace back piece-by-piece the bytes stored in the memory, and thereby obtain e.g. a program code.

SUMMARY OF THE INVENTION WITH OBJECTS

It is an object of the present invention to provide a new dump mode which cannot be used by an attacker to extract partial checksum values that could otherwise reveal memory contents, whilst allowing a checksum test to be conducted for normal test purposes.

The invention can thus provide the possibility of carrying out a checksum which is delivered only under given conditions. One of these conditions is that at least a predetermined portion, and preferably all of the memory contents have to be entered in the checksum calculation before a checksum value is delivered as an accessible output. The final value of the checksum can then be used to check the validity of the memory, but not to reconstitute its specific contents owing to the large number of samples necessarily involved.

More specifically, the present invention proposes an electronic device containing protected data, comprising:
  memory means for storing the protected data;
  checking means, operative in a first mode, for checking the validity of the data and for producing a validity signal enabling to determine whether the data is valid; and
  validity signal output control means for inhibiting an output of the validity signal to outside the device until the validity of a predetermined quantity, and preferably all, of the protected data has been checked.

The data to be checked can be sent to the checking means by cycling through successive memory addresses.

The checking means preferably performs an algorithm involving each item of the protected data to be checked and yielding the validity signal in the form of a value resulting from the algorithm, such as a checksum calculation.

In the preferred embodiment, the protected data is bound by first and second extremity addresses, and the device comprises mode control means authorizing access into the first mode only when the first extremity address of the memory is selected as a starting point for transferring data therefrom to the checking means. Note that the first extremity can be either the first address or the last address of the protected data, depending on whether the addresses are cycled through incrementally or decrementally.

The mode control means preferably causes an exiting from the first mode when the second extremity address has been attained, i.e. when all the addresses of the protected data have been cycled through.

The validity signal output control means can be made operative to inhibit the output of the validity signal all the while the first mode is active.

Preferably when the device is provided with a device reset function, reset means are provided for resetting the checking means in response a device reset applied when the device is in the first mode, and/or means for exiting from the first mode upon a device reset.

In the preferred embodiment, the device comprises latching means for temporarily latching a logic state indicating the presence of the first mode and gating means transferring the device reset signal to a reset input of the checking means only when the logic state is present in the latching means, the latching means temporarily maintaining the gating means enabled after a disappearance of the logic state caused by the device reset signal.

There can also be provided reset means operative to reset the validity signal upon the device being forced to leave the first mode prematurely in any other way.

The validity signal output control means may comprise gating means for controllably transferring the validity signal to outside the device, the gating means having an inhibit input connected to receive a mode signal for inhibiting transfer of the validity signal all the while the first mode is active.

The memory means advantageously comprises a chip select or chip enable input, the input being connected to selection means delivering an enable signal when a first mode selection signal, and a protection option signal are active.

The selection means can deliver the enable signal on a further condition that an address belonging to the memory means has been selected at an address input thereof.

At least the memory and the checking device can be formed on a common chip and interconnected by an internal bus.

The memory means can be a read-only memory, e.g. of the mask ROM type.

The protected data can comprise program code.

The device can implemented in a microcontroller unit or microprocessor chip.

The invention also relates to a method of protecting data contained in memory means of an electronic device associated with checking means and operative in a first mode for checking the validity of the data and for producing a validity signal indicative of whether the data is valid, the method comprising the step of inhibiting an output of the validity signal to outside the device until the validity of a predetermined quantity of the protected data has been checked.

The optional features introduced above in connection with the device of the invention can be implemented mutatis mutandis to the above method.

BRIEF DESCRIPTION OF THE DRAWINGS

The invention and its advantages shall be more clearly understood from reading the following detailed description of the preferred embodiments, given purely as non-limiting examples, with reference to the appended drawings in which:

FIG. 2 is a flow chart showing the conditions and effects of a protected dump mode in accordance with the invention;

Referring to FIG. 2, there shall be explained the conditions for entering into and exiting from a protected dump mode in accordance with the invention, and its technical effects. In the example, the protected dump mode is implemented with a ROM provided with a chip select CS input and containing protected data such as program code. The protected dump can in this case be used to transfer securely ROM data to a checksum circuit that is internal to the programmed system. Only the final result of checksum can become externally accessible for evaluating the correctness of the stored data.

Figure 1:
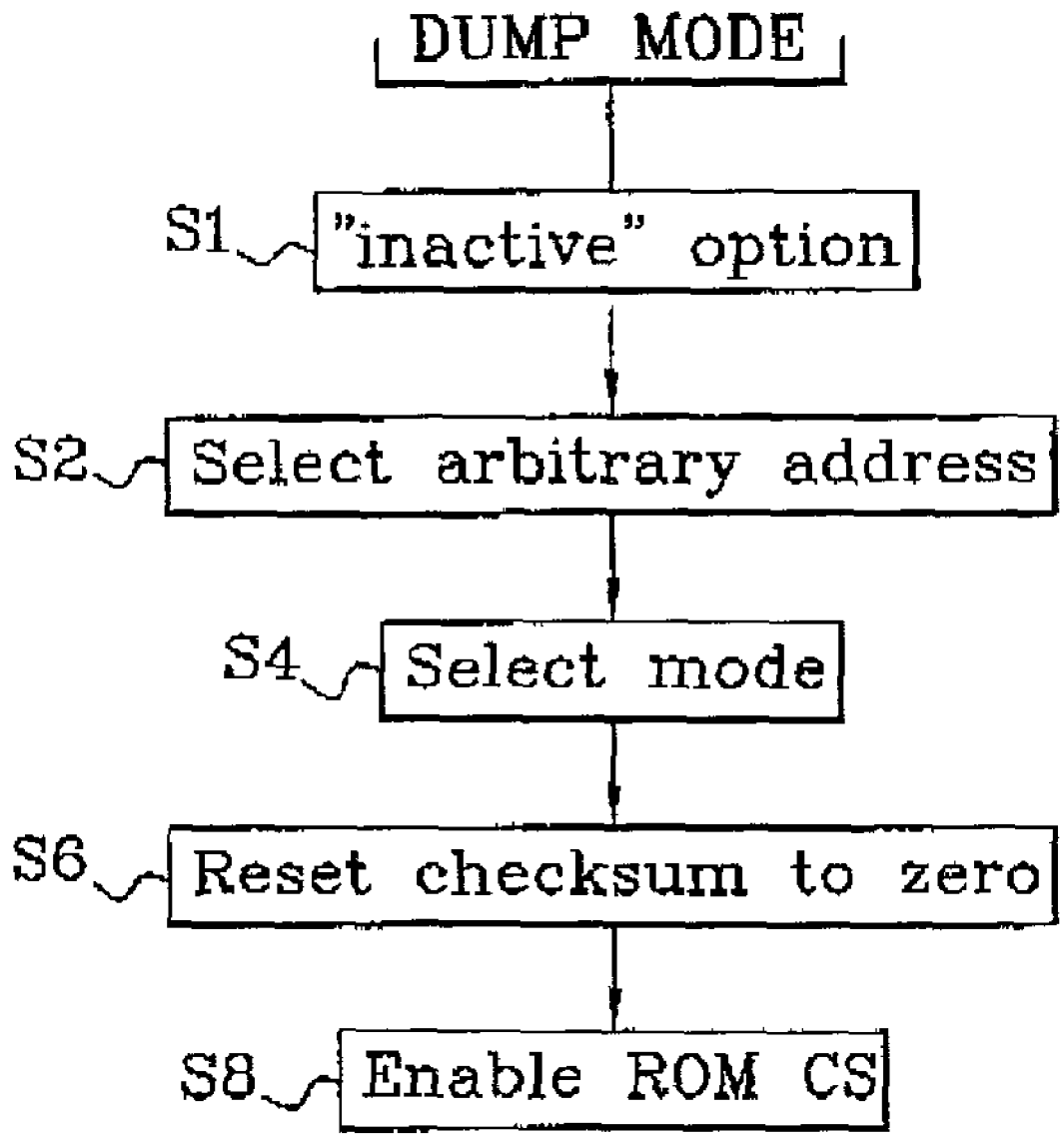
FIG. 1, already described, is a flow chart showing how a normal dump mode is established with a ROM for obtaining a checksum test on its contents, according to the prior art.

The top portion 2 of FIG. 2 indicates the conditions for entry into the protected dump mode, which are as follows the static option is activated, i.e. the protected mode is selected for the ROM (C1);

the address from which the protected dump is effected must be an extremity address (first or last address of the memory array) (C2). The extremity address is the first address when the dump is made to increment each address read out by one unit and is the last address when the dump is made to decrement each address read out by one unit. This condition ensures that a checksum cannot be started from intermediate memory addresses. In this respect, it serves to cause the checksum to be conducted for all the memory addresses, so preventing a reconstruction of data from checksum values derived from a very small number of addresses. (In the example, the extremity address is taken to be the first address);

the dump mode is selected (C3). This can be achieved by a logic combination applied to specified input pins, or by any other means. Because the protected dump mode is intrinsically secured, the logic combination need not necessarily have to remain confidential for the protection of data to remain effective, unlike in the prior art; and the checksum (resulting from a previous checksum calculation) is reset to 0, or optionally to some other known value that can serve as a reference point for a checksum calculation (C4).

Once the ROM successfully enters the protected dump mode (portion 4 of FIG. 2, symbolized by two parallel arrows), the programmed system generates the following conditions:

the checksum is not externally accessible all the while the protected dump is active (C5). This ensures that no intermediate checksum values can be read while the checksum algorithm is being executed the current checksum value is automatically reset to zero (or some arbitrary value devoid of information) upon a system (device) reset (C6). This measure ensures that it is no longer possible to use a system reset as way of "freezing" an intermediate calculated checksum value, as was possible in the prior art. Thus, the above condition (C6), in combination with the condition that the protected dump must start at an extremity of the memory array (C2), ensures that a meaningful checksum value shall only be obtainable if data from all the memory addresses are entered into the checksum, as would be required in a normal test procedure. Under such conditions, the number of data items involved in the checksum calculation, e.g. corresponding to 8 kbits, is far too vast to allow individual identification of the bytes from the single resulting checksum value; and the ROM chip select is enabled (C7), to allow the ROM data to be delivered to an internal system bus for access by the checksum calculation unit.

The ROM is made to exit from the protected dump mode when any one of the following two conditions is satisfied:

the address input is outside the range of addresses contained in the ROM (C8). This condition ensures that—except in the event of a system reset—the protected dump mode shall remain active all the while the incremented or decremented address corresponds to a valid ROM address. In this way, all the data values of the ROM will be cycled through for the checksum calculation; or a system reset is applied (C9). This condition thus still allows the protected dump mode to be interrupted, e.g. in the event of a system error. However, the value of the checksum when this reset occurs is destroyed (reset to zero following conditions C10 and C6). Thus, an incomplete checksum value cannot be retrieved.

It is clear that the above safeguards still allow a normal test mode based on a checksum calculation to be effected at any time.

There shall now be described with reference to FIGS. 3 and 4 an embodiment of a ROM and its peripheral circuitry configured to implement the above protected dump mode, in conjunction with a checksum calculation unit.

Figure 3:
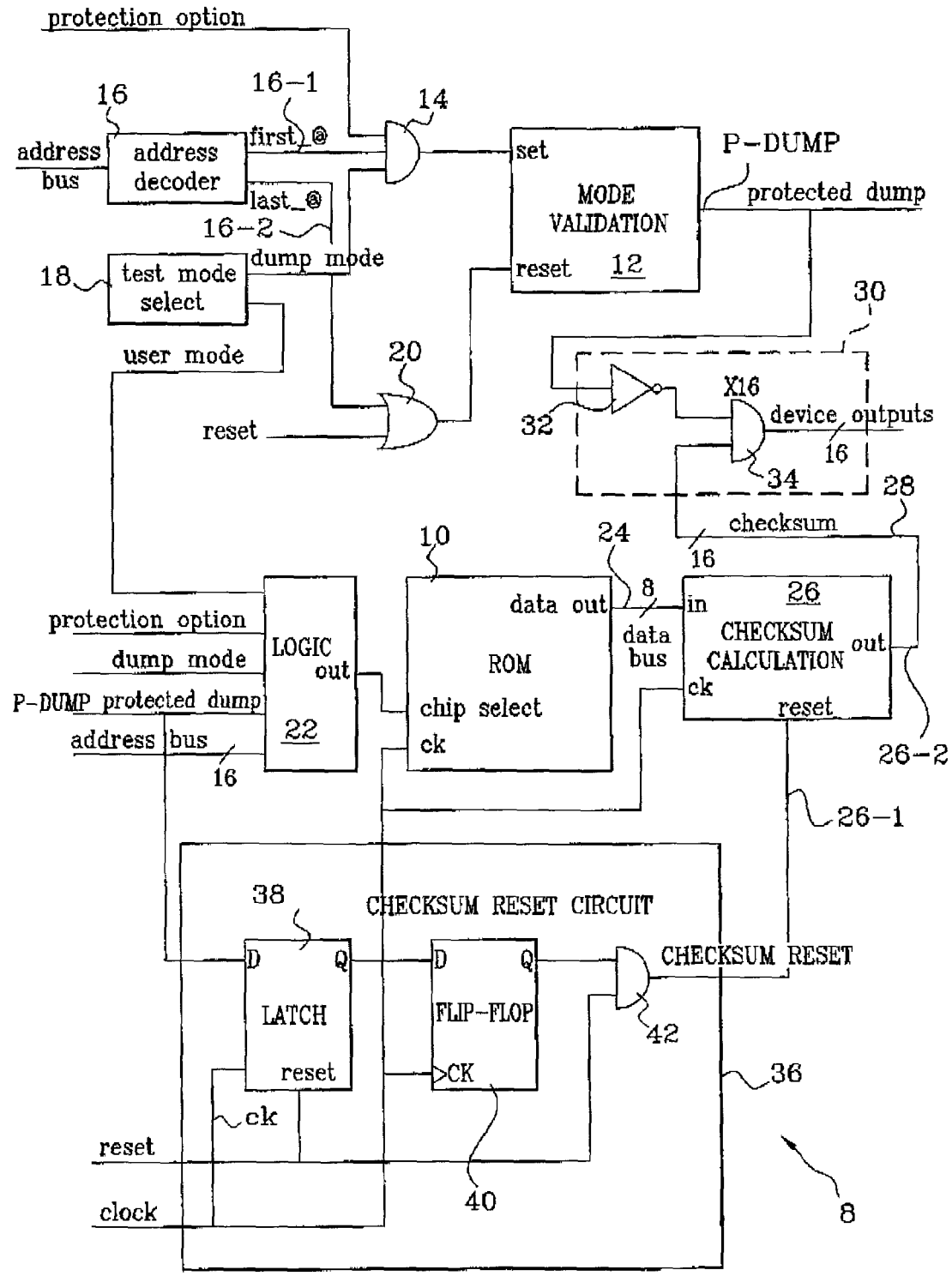
FIG. 3 is a block diagram of a ROM and its peripheral circuitry within a microcontroller chip.

FIG. 3 shows the general elements 8 of the protected ROM and its peripheral circuitry in block diagram form. All these elements are formed on a substrate belonging to a microcontroller device (MCU), the latter also implementing on a single chip a central processing unit (CPU), internal buses, memory areas, input and output interfaces, etc. (not shown). Thus, all the interconnections between the different elements of FIG. 3 are internal, i.e. within the chip, and not normally accessible from the outside.

In the example, the ROM is of the "mask" type, in which the data contents are written in during the wafer fabrication stage. It can however be an electrically programmable memory (EPROM), flashprom, etc. depending on applications.

The contents of the ROM 10 include a user program for execution by the microcontroller. The user program is stored in the form of data bytes at respective memory locations, according to a program code.

The top portion of the diagram shows a mode validation unit 12 for validating the protected mode. This unit 12 is composed entirely of wired logic elements. The left-hand portion of the diagram from that unit shows the means which apply the conditions for entering or leaving the protected dump mode. Entry into the protected mode is through a "set" input of the mode validation unit 12. This input is activated via a three-input AND gate 14, each gate input receiving a signal corresponding to a respective one of the conditions C1 to C3 defined above with reference to FIG. 2. Specifically, AND gate 14 receives:

a first signal at logic 1 when the protection option is active;

a second signal at logic 1 only when the first ROM address is selected. This second signal is delivered from a first output 16-1 of an address decoder 16 which receives all the addresses supplied to the ROM via an internal address bus, and produces for that first output a logic 1 signal only when the address bits have the logic combination corresponding to the first ROM address; and a third signal at logic 1 only when the dump mode is selected. This signal is produced by a test mode select circuit 18 accessible by external command signals.

AND gate 14 thus ensures that the set input of the mode validation unit 12 is enabled when all three conditions C1–C3 are satisfied.

The fourth condition C4, viz. that the checksum is reset to zero, is ensured automatically by a reset signal applied to the circuit's checksum calculation unit, as shall be explained further. It is thus not necessary to have this condition monitored at the level of the set input of the mode validation unit 12.

The mode validation unit 12 also comprises a "reset" input for exiting from the protected dump mode. This input is activated via a two-input OR gate 20, which ensures that either one of conditions C8 and C9 (FIG. 2) is met. Specifically, OR gate 20 receives:
- a first input signal generated from a second output 16-2 of the address decoder 16, the latter producing a logic 1 signal at that second output only when the address bits of the address bus have a logic combination corresponding to the last address of the ROM. Of course, this last address is read so that its contents can be processed for the checksum calculation; and
- a system reset signal, in the form of a pulse at logic 1, when a circuit or system reset is activated. This reset signal is also activated upon powering the system (power-up reset).

The output of the mode validation circuit 12 establishes the presence of the protected dump by delivering a signal P-DUMP active when at logic 1.

The central portion of the diagram shows the protected ROM 10 with its chip select (CS) input controlled by a selection logic circuit 22 and its data output delivered on an 8-bit internal parallel bus 24 to a checksum calculation unit 26.

The selection logic circuit 22 performs a decoding function to signal when the ROM 10 is allowed to output its data or not. This is conditioned by the user mode being active (since it is necessary to execute the ROM program) or the protection to authorize selectively the readout of the ROM; the protected dump then allows the ROM to send its data on the data bus.

More specifically, the selection logic circuit 22 receives:
- a first signal output from the test mode select circuit 18 indicating the presence of a user mode by a logic 1;
- a second signal indicating the presence of a normal dump mode by a logic 1;
- a third signal indicating the presence of the protected dump mode by a logic 1, this signal being the P-DUMP output from the mode validation unit 12; and
- the contents of the memory address bus (on sixteen bits). This ensures that the ROM can only be accessed for valid ROM addresses. For instance, the ROM 10 is not selected if the address on that bus happens to correspond to a RAM address of the system.

The selection logic circuit 22 delivers the chip enable CS signal (active at logic 1) under the following conditions: the address bus must contain a ROM address and the system must be either in the user mode or in the protected dump mode, with the protection option activated. It also ensures that a normal dump mode can be enabled for the case where the protected dump option is not activated.

When the ROM 10 is enabled in the protected dump mode, it delivers its stored data to the checksum calculation unit 26 at a rate determined by a system clock signal applied to its clock input. The ROM then delivers its contents sequentially to the checksum calculation unit from its first address to its last address, the addresses being incremented at each clock cycle. In the example, the content of each address is in the form of an 8-bit byte which is processed as a binary number.

The checksum calculation unit 26 processes these successively-received bytes using a cyclic algorithm, i.e. in which the result of each byte processed is a function of both the value of that byte and the result of processing the previous byte. In this way, the result of the checksum depends on the entire history of the previous intermediate checksum results.

In the example, the intermediate checksum values are present at the output 26-2 of the checksum calculation unit 26, i.e. the output yields each new updated value of the checksum algorithm. This output is delivered in 16-bit digital form on an internal checksum bus 28.

The contents of the checksum bus 28 are filtered by a checksum filtering circuit 30 before being made externally accessible. The function of this circuit 30 is to ensure that the checksum value cannot be delivered to the outside all the while the ROM circuit 8 is in the protected dump mode (cf. FIG. 2, condition C5).

To this end, the checksum filtering circuit 30 is composed of an inverter 32 having its input connected to the P-DUMP signal output of the mode validation unit 12, and a set of sixteen AND gates 34, one for each bit of the checksum value on the checksum bus 28.

Figure 4:
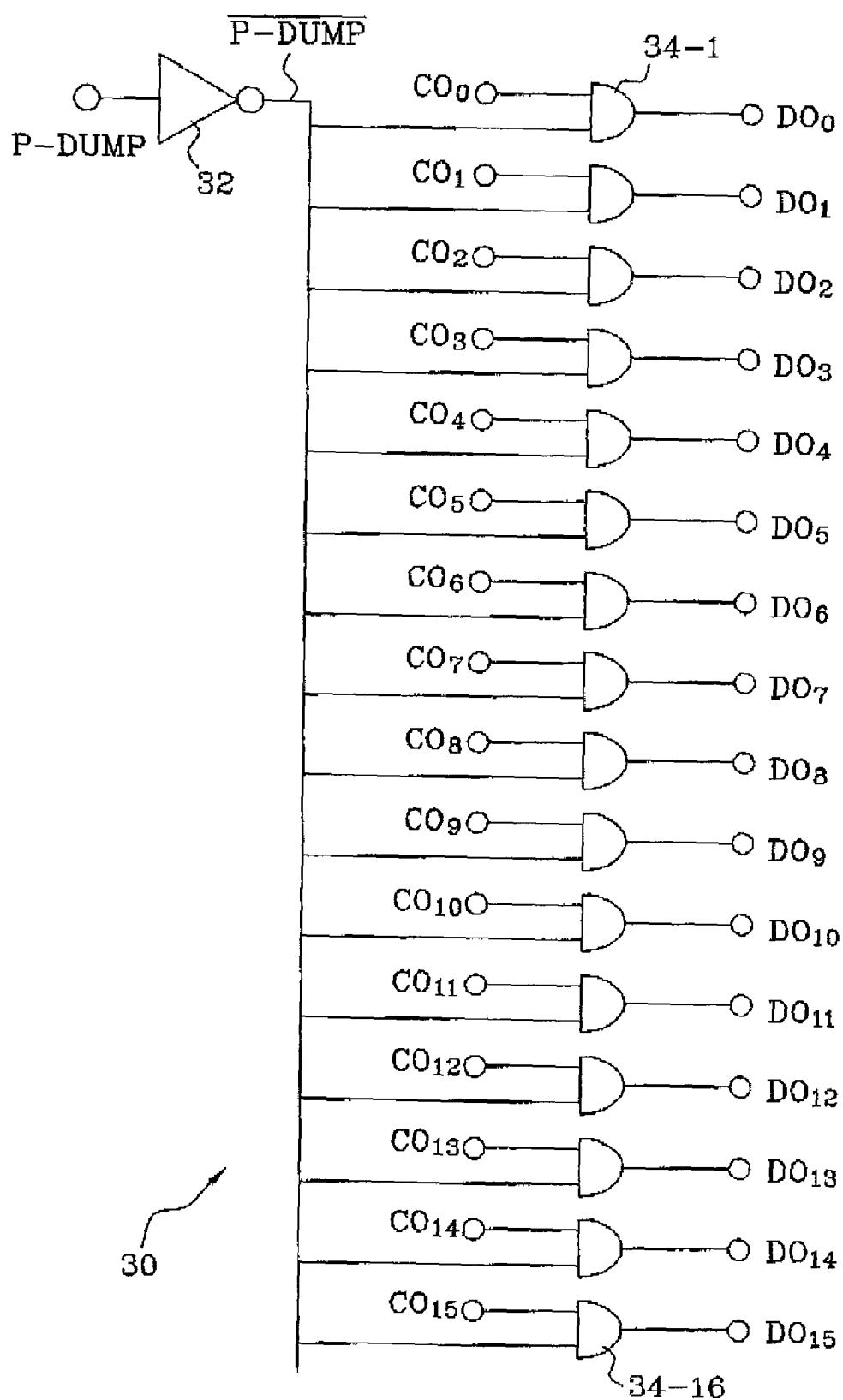
FIG. 4 is a detailed circuit diagram of an output stage for delivering a final checksum value in the circuitry of FIG. 3.

As shown in more detail in FIG. 4, each AND gate 34-1 to 34-16 has two inputs, one connected to the output of the inverter 32 to receive a signal P-DUMP bar, which is at logic 0 when the mode validation unit 12 establishes and maintains the protected dump mode, and the other connected to a respective bit CO0 to CO15 of the checksum bus 28. The output of each AND gate is supplied to the outside through respective outputs DO0–DO15. While these outputs can de delivered on sixteen respective output pins, the embodiment in fact uses the so-called J-tag communications protocol based on five pins with a bidirectional serial communication.

The P-DUMP bar output from the inverter 32 serves to inhibit the transmission of the checksum output bits CO0–CO15 through their respective AND gates 34-1 to 34-16. Thus, all the while the protected dump mode is active (P-DUMP bar at logic 0), the external checksum outputs DO0–DO15 taken out from the AND gates remain at logic 0, and hence no information on the checksum calculation process is externally available.

Upon release from the protected dump mode, the output signal P-DUMP returns to logic 0, so making P-DUMP bar=1, and the AND gates 34-1 to 34-16 thus become enabled to transmit the checksum to the outputs DO0–DO15. In this way, the final checksum value is externally available at the end of an uninterrupted protected dump, i.e. which ends after the last address has been reached and processed.

The checksum calculation unit 26 comprises an internal reset input 26-1 which causes the checksum value to become zero when a logic 1 pulse is applied thereto. Such a pulse thus effectively clears any existing checksum value, so that all the outputs CO0–CO15 on the checksum bus resume the logic 0 state. This reset is used at each start of a checksum calculation.

In the embodiment, the internal reset input 26-1 is used to satisfy the condition that the checksum is brought to zero in the case of a system reset (FIG. 2, condition C6). To this end, the reset input 26-1 is connected to the output of a checksum reset circuit 36 which produces a checksum reset signal in response to a general system/device reset pulse.

The checksum reset circuit 36 serves to ensure that the checksum reset can only be activated from the protected dump mode. This allows the checksum calculation unit 26 not to be reset upon a system reset if the system is in some other mode, for instance the normal dump mode (as selected by the test mode select portion 18), where such a safeguard may not be desired. Thus, in order to cause the checksum reset upon receiving the system reset pulse, the checksum reset circuit 36 detects the presence of the P-DUMP signal at logic 1, and only sends out the checksum reset signal when the presence of the active P-DUMP signal is established. However, the P-DUMP signal immediately switches over from logic 1 to logic 0 upon application of a system reset signal—as required—through the reset input of the mode validation circuit 12 and OR gate 20. There thus occurs a temporary undetermined logic relation between the P-DUMP and system reset signals during this transition period. To accommodate for this, the checksum reset circuit 36 comprises means for provisionally latching the logic 1 state of the P-DUMP signal, so ensuring a glitch-free reset of the checksum calculation unit.

The latching means are comprised of a D-type latch 38 and a flip-flop 40. The D-type latch 38 has its data input D connected to receive the P-DUMP signal and its latched output Q connected directly to the data input D of the flip-flop 40. Both the D-type latch 38 and the flip-flop 40 have their clock inputs CK connected to the system clock. The D-type latch also has its reset input connected to receive the system/device reset signal.

The Q output from the flip-flop 40 is applied to a first input of a two-input AND gate 42, the second input of the latter receiving the system/device reset signal. The output of this AND gate is connected directly to the checksum calculation unit reset input 26-1. AND gate 42 thus functions as a logic filter to produce the checksum reset signal only when both the P-DUMP signal is present on the flip-flop's Q output and the system reset pulse is applied.

The cascade connection of the D-type latch and flip-flop processes the P-DUMP signal as follows. When the P-DUMP signal is initially set to logic 1, this state is latched at the following clock pulse and transmitted to the latch's Q output, and thus to the flip-flop's D input. It then appears at the Q output of the latter at the following clock pulse, where it is applied to the first input of AND gate 42. When the P-DUMP signal makes the transition from logic 1 to logic 0 as a result of a system/device reset, that reset signal is used to reset the D-type latch. Accordingly, a logic 0 state is transferred to the D-input of the flip-flop 40 at the following clock cycle. However, the Q output of the latter provisionally remains at logic 1, so allowing the reset pulse to be transmitted positively as soon as it appears at the second input of AND gate 42. It is only after the following clock cycle that the flip-flop 40 transfers the logic 0 to its Q output. By that time, however, the reset signal has had ample time to propagate and establish at the reset input 26-1 of the checksum calculation unit 26 to effect a reliable reset operation.

It shall be clear to the person skilled in the art that many equivalent embodiments and variants can be contemplated within the scope of the present invention.

For instance, the invention is not limited to the manner in which the RON is blocked. The embodiment uses the fact that most memories comprise a chip select input/enable or similar to implement the blockage at that level. It is however also possible to interpose a blocking circuit between the data buses interconnecting the ROM with the rest of system, etc.

Also, the circuit can be configured equivalently with the protected dump mode arranged to allow the contents of the protected RON to be supplied to the checksum calculation unit going backwards from the last address to the first address, in which case the outputs 1-1 and 16-2 of the address decoder 16 would be reversed.

The embodiment has been described in the context of a mask RON embedded in a microcontroller. The invention can however be contemplated in a variety of other applications and with other memory technologies, such as programmable ROMs, magnetic domain memories, optical memories, etc. Although the example has been set in the context protected program code, the stored data protected in accordance with the invention can also be of any other type, such as: personal code, messages, copyrighted information, etc.

It will appreciated that the solution according to the invention works entirely at a functional level, i.e. it does not call for measures taken during specific fabrication steps, by contrast with the prior art approach based on a fusible link. It is also extremely secure, by contrast with the approach based on a simple encoding on a few pins or on a simple coded input sequence for entering into the test mode.

Moreover, it is possible to test the memory contents at all times, by contrast with the fusible link approach.

While the invention has been described in connection with a preferred embodiment, it is to be understood that the invention is not limited to the disclosed embodiment but, on the contrary, is intended to cover various modifications and equivalent arrangements included within the spirit and scope of the appended claims.

The invention claimed is:

1. A system including an electronic device containing protected data, the electronic device comprising:
    a local processor;
    memory protection logic operable to interface with memory for accessing protected data stored therein, wherein access to said protected data is restricted for access by said local processor for execution thereon within the electronic device;
    validation logic, operative in a first mode and a second mode, for checking the validity of said protected data and for producing a validity signal to indicate whether said protected data is valid, said validation logic being accessible from outside of the electronic device for setting the electronic device into one of said first mode and said second mode;
    validity signal output control logic for inhibiting an output of said validity signal to outside the electronic device while in said first mode, the electronic device remaining in said first mode until the validity of a predetermined quantity of said protected data has been checked;
    a system reset function for resetting the system including at least said local processor; and
    a device reset function for resetting said validity signal in response to said system being reset while the electronic device is in said first mode, wherein said device reset function does not reset said validity signal in response to said system being reset while the electronic device is in said second mode.

2. The system of claim 1, wherein said validity signal output control logic inhibits the output of said validity signal until the validity of all said protected data has been checked.

3. The system of claim 1, further comprising means operative in said first mode for transferring said data to be checked to said validation logic by cycling through successive memory addresses.

4. The system of claim 1, wherein said validation logic performs an algorithm involving each item of said protected data to be checked and yielding said validity signal in the form of a value resulting from said algorithm.

5. The system of claim 4, wherein said algorithm IS a checksum calculation.

6. The system according to claim 1, wherein said protected data is bound by first and second extremity addresses, said device comprising mode control means authorizing access into said first mode only when said first extremity address of said memory is selected as a starting point for transferring data therefrom to said validation logic.

7. The system according to claim 6, wherein said mode control means causes an exit from said first mode after said second extremity address has been attained.

8. The system of claim 1, provided with a device reset function, wherein said device further comprises reset means for resetting said validation logic in response to a device reset in said first mode.

9. The system of claim 1, provided with a device reset function, wherein said device further comprises means for exiting from said first mode upon a device reset.

10. The system of claim 9, wherein said device reset function comprises latching means for temporarily latching a logic state indicating the presence of the first mode and gating means for transferring the device reset signal to a reset input of the validation logic only when said logic state is present in the latching means, the latching means temporarily maintaining said gating means enabled after a disappearance of the logic state caused by the device reset signal.

11. The system of claim 1, further comprising reset means operative to reset said validity signal upon said device being forced to leave said first mode prematurely.

12. The system of claim 1, wherein said validity signal output control logic comprises gating means for controllably transferring said validity signal to outside said device, said gating means having an inhibit input connected to receive a mode signal for inhibiting transfer of said validity signal all the while said first mode is active.

13. The system of claim 1, wherein said memory means comprises a chip select or chip enable input, said input being connected to selection means for delivering an enable signal when a first mode selection signal and a protection option signal are active.

14. The system of claim 13, wherein said selection means delivers said enable signal on a further condition that an address belonging to said memory means has been selected at an address input thereof.

15. The system of claim 1, wherein at least said memory and said checking device are formed on a common chip and interconnected by an internal bus.

16. The system of claim 1, wherein said memory means is a read-only memory.

17. The system of claim 1, wherein said protected data comprises program code.

18. The system of claim 1, implemented in a microcontroller unit or microprocessor chip.

19. A method of protecting data contained in memory of an electronic device of a system, the method comprising:
coupling memory protection logic to interface with memory for accessing protected data stored therein, wherein access to said protected data is restricted for access by a local processor for execution thereon within the electronic device;
from outside of the electronic device, setting the electronic device into one of a first mode and a second mode;
checking the validity of said protected data and producing a validity signal indicative of said protected data being valid, wherein the checking and producing steps are performed when the said electronic device is in one of said first mode and said second mode;
inhibiting an output of said validity signal to outside the electronic device while in said first mode, the electronic device remaining in said first mode until the validity of a predetermined quantity of said protected data has been checked;
resetting the system including at least said local processor; and
resetting said validity signal in response to resetting the system while the electronic device is in said first mode, wherein said validity signal is not reset in response to resetting the system while the electronic device is in said second mode.

20. The method of claim 19, wherein said validity signal output control means inhibits the output of said validity signal until the validity of all said data to be protected has been checked.

21. The method of claim 19, wherein said data to be checked is checked by cycling through successive memory addresses.

22. The method of claim 19, wherein said check involves performing an algorithm on each item of said protected data to be checked and yielding said validity signal in the form of a value resulting from said algorithm.

23. The method of claim 22, wherein said algorithm is a checksum calculation.

24. The method of claim 19, wherein said protected data is bound by first and second extremity addresses, and access into said first mode is authorized only when said first extremity address of said memory is selected as a starting point for transferring data therefrom to said checking.

25. The method according to claim 24, wherein said access into said first mode is authorized only when said first extremity address along with said second extremity address has been selected.

26. The method of claim 19, further comprising the step of exiting from said first mode upon a device reset.

27. The method of claim 26, further comprising the step of temporarily latching a logic state indicative of the presence of said first mode and controllably passing said device reset signal to a reset input of said checking when said logic state is latched.

28. The method of claim 19, further comprising the step of resetting said validity signal upon said device being forced to leave said first mode prematurely.

29. The method of claim 19, further comprising the step of delivering to a chip select or chip enable input of said memory means an enable signal when a first mode selection signal, and a protection option signal are active.

30. The method of claim 29, further comprising the step of delivering said enable signal on the further condition that an address belonging to said memory means has been selected at an address input thereof.

31. The method of claim 19, wherein said protected data comprises program code.

32. The method of claim 19, implemented in a microcontroller unit or microprocessor chip.

* * * * *